Sept. 20, 1955　　　　C. I. BURKE　　　　2,718,033
FISH LURES AND A METHOD OF MAKING THEM
Filed July 30, 1952
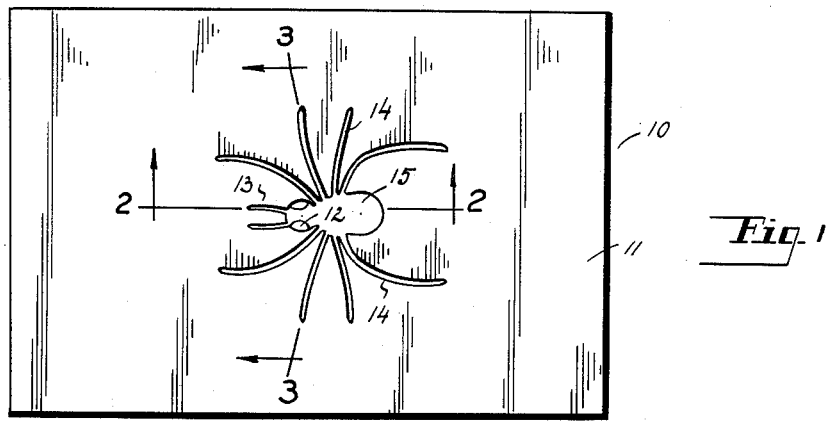
Fig. 1
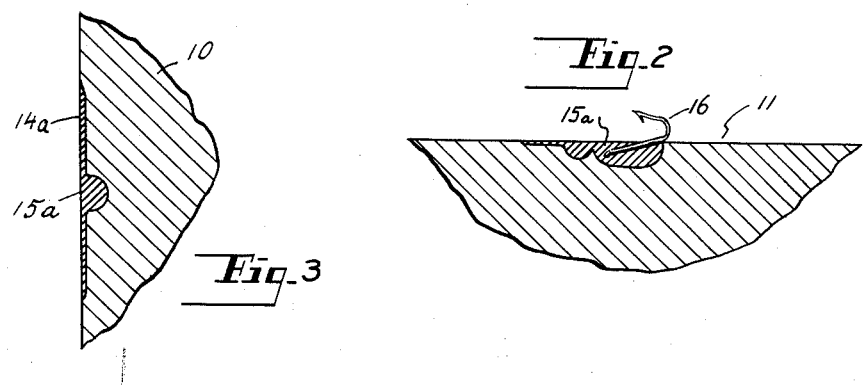
Fig. 2
Fig. 3
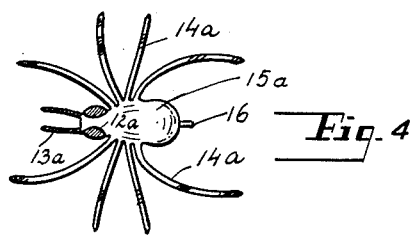
Fig. 4
INVENTOR.
CHARLES I. BURKE
BY Louis Chayka
ATTORNEY.

United States Patent Office 2,718,033
Patented Sept. 20, 1955

2,718,033

FISH LURES AND A METHOD OF MAKING THEM

Charles I. Burke, Traverse City, Mich.

Application July 30, 1952, Serial No. 301,761

4 Claims. (Cl. 18—59)

My improvement pertains to fish lures made of plastics in imitation of crabs, grubs, fully-developed insects, etc., the lures having the form and the coloring of living prototypes copied by me.

A more specific object of my improvement is to provide a fish lure which will have a main body portion adapted to keep the lure afloat and other parts, such as feelers and appendages, which are fused to said main body portion.

I shall now describe my improvement with reference to the accompanying drawing in which:

Fig. 1 is a top elevational view of a mold for a lure having the shape of a spider;

Fig. 2 is a fragmentary, longitudinal sectional view through the mold taken along line 2—2 of Fig. 1;

Fig. 3 is a fragmentary sectional view taken along line 3—3 of Fig. 1;

Fig. 4 is a top elevational view of a completed lure.

Similar numerals refer to similar parts throughout the several views.

In referring to a mold I have in mind a metal plate 10 having a flat upper surface 11 which is provided with a carved-out, engraved, or otherwise formed cavity adapted to reproduce the body and the appendanges, that is, legs, antenna, wings, and other details of the anatomy of a particular specimen of a live object.

I make the lures out of plastic materials, preferably of pigmented synthetic resins which will be more specifically identified herein. The lures made by me include tenuous parts which, when the lures are drawn through the water, as at the end of a fish line, will have movements imparting to the lure of a life-like appearance.

To start with, and referring to my drawing, I first deposit small quantities of a plastic of black color into the small socket-like cavities 12 within the mold to reproduce the eyes 12a of the simulated spider. For this purpose the plastic is preferably of high viscosity in order that it may not infuse a plastic of a different color of which the body of the spider, including its head, is to be made.

A thin film of a black-tinted plastic in a freely flowable condition is applied over the thin, shallow grooves 13 intended to reproduce feelers 13a. Small quantities of the same plastic are deposited intermittently in grooves 14 in order to reproduce legs 14a. Thereupon, the cavity 15 provided for the purpose of reproducing the body 15a of the spider is filled with plastic of a suitable color. A plastic of the same color but not in a freely flowable condition may also be applied to the yet unfilled engravings or grooves of the leg portions of the lure.

At this stage I wish to specify that the body portion 15a of the lure is to be made of what is known as a foaming plastic; that is, plastic which when exposed to heat during the curing process will release or generate a quantity of gas, forming tiny bubbles within the texture thereof. An important aspect of the bubble formation is that said bubbles are not interconnected, so that the lure will not fill with water as may be the case if the lure were made of such a material as sponge rubber.

I make my lures out of synthetics, resinous material, specifically, out of polyvinyl resins such as Geon which possesses properties between rubber and rigid thermoplastics, is non-inflammable, odorless, and resistant to water, acids, alkalis, most organic solvents, oils, fats, and greases.

As the lures are to float in water, the body of the specific lure will include a quantity of a foamable plastic which may be made out of Geon with addition of a foaming agent, such as Dupont "Unicel n.D," or out of a species of polyvinyl resin, such as that made by the Interchemical Company and identified by No. 7810.

On being heated, the foaming agent within the composition will generate gas bubbles which will expand the volume of said body, making it light enough to float on water.

The appendages of a lure, such as legs and feelers, and also the eyes of said lure, are made of a non-foaming resinous plastic, such as polyvinyl chloride.

It will be understood that the composition of the body portion of the lure may be varied without departing from the inventive idea disclosed herein of having said body portion made of a foamable synthetic resinous plastic or plastics of the thermoplastic group.

As some of the plastic deposited within the cavity of the mold may overflow the upper surface of the mold plate, the overflow, especially over the fine, tenuous grooves of the mold, has to be removed. This is best done by means of a scraper which is preferably made of a plastic and which includes a straight edge blade for operative contact with the surface of the mold plate. The plastic for the scraper is one that is rigid enough to prevent permanent deformation by its operative use, but it must have a degree of softness along its blade to permit an intimate contact of the blade with the surface of the mold so as to free it from any residue or film of the plastic employed within the mold. Another requirement is that the scraper be unaffected by solvents of the plastics used in the mold, so as to prevent swellings and any deterioration of the working edge of the scraper.

After the overflow of the plastics has been removed from the surface of the mold plate, the shank of a fish hook 16 is immersed in the plastic mass within the mold so that the operative end of the hook will project above the surface of the mold plate. To keep the hook in said position during the period of curing of the lure, I use a suitable holding jig or clamp. The plastics now being ready to be cured, the mold plate is heated from below, which is best done by having it placed upon a hot plate. The time of curing, which lasts on the average from four to six minutes, depends upon the volume of the plastics within the mold and the time needed for expansion of the foamable material forming the main part of the lure. The temperature at which the plastics are to be cured is 350° Fahrenheit. Exposed to heat within the mold, the foaming plastic will fuse along the surface of contact with the non-foaming material out of which the thin appendages of the lure are made so that the lure when completed will present an integrally-connected whole, that is, a gas-expanded body and non-expanded legs, feelers, etc.

As the next step in the production of the lures the mold plate is cooled quickly by having its lower portion immersed in water. Upon cooling of the plate the plastic lure may be removed therefrom.

Some of the lures made by me, as, for instance, a lure imitating a grasshopper, include legs which are to be set at a downwardly-sloping angle from the body of the lure. I make these lures according to the method described above, but after the lure has been cured I heat the respective portions of the lure by means of an infra-red heating bar in order that the legs or any other portions of the lure may be deflected, curved, or bent as desired to increase resemblance to living models of the respective lures. However, this is a manual operation which is no essential step of my method.

What I wish to claim is as follows:

1. A method of casting a fish lure in simulation of specimens of lower forms of life, such as insects and reptiles, in an open-face mold including a cavity for the main body portion of a lure and grooves adapted to reproduce appendages connected to said body portion, the method comprising filling the cavity with a flowable plastic capable of expanding its mass when heated to make the body capable of floating on water, filling the grooves with a flowable plastic, non-expanding during curing, heating the plastics within the mold to cure them and to cause the plastic within the cavity to fuse with the plastic within the grooves, cooling the plastics, and removing the lure from said mold.

2. A method of casting a fish lure simulating specimens of lower life, is open face molds including for each specimen a cavity for the main body portion of the lure, recesses for eyes, and grooves adapted to reproduce thin members extending from said body, the method comprising, depositing a quantity of a plastic of high viscosity into the recesses, filling the cavity with a plastic of a different color and of a type which will foam when heated, filling the grooves with a plastic of a type which will not foam when heated, inserting the shank of a fish hook into the plastics within the mold and holding it therein, exposing the plastics within the mold to heat for the purpose of curing them and of simultaneously expanding said first-named plastic to render it floatable on water, and to cause the plastic of the body portion of the lure to fuse with the plastics within the grooves and recesses, cooling the plastics by immersing the mold in water and removing the lures from the mold upon cooling.

3. A method of making a fish lure, simulating an insect, comprising providing a mold having cavities and grooves, applying within certain of the cavities a color material, applying in the other cavities material of one or more different colors, applying in said grooves a material of a color different from the color of the aforementioned materials, depositing a plastic which will foam when heated in one or more of said cavities, and applying a plastic of a type which willl not foam when heated in said grooves, curing the materials in said mold by heat to effect the simultaneous fusion of all of the materials, cooling the mold and the fused materials therein, and releasing the formed lure from the mold.

4. A method of casting a fish lure simulating a specimen of lower life, such as insects, crustaceans, and reptiles, in open face molds made in a mold plate and including for each specimen a cavity for the main body portion of the lure and grooves adapted to reproduce thin members extending from said body, the method comprising filling the cavity with a resinous plastic which will foam when heated, in a flowable condition, filling the grooves with a flowable plastic of a type which will not foam when heated, removing the surplus of plastics overflowing the face of the mold plate, inserting the shank of a fish hook into the first-named plastic within the mold and holding it in place, exposing the plastics within the mold to heat for the purpose of curing them, also for the purpose of expanding said first-named plastic to render it capable of floating on water and to cause the plastic of the body portion of the lure to fuse with the plastics within the grooves, cooling the plastics, and removing the lure from the mold upon cooling.

References Cited in the file of this patent

UNITED STATES PATENTS

| | | |
|---|---|---|
| 2,242,708 | Lancaster | May 20, 1941 |
| 2,500,494 | Jeffers | Mar. 14, 1950 |
| 2,511,117 | Loeb | June 13, 1950 |
| 2,563,522 | Fisher | Aug. 7, 1951 |